United States Patent [19]

Tardy

[11] Patent Number: 4,596,274

[45] Date of Patent: Jun. 24, 1986

[54] SLIDE CONTROL VALVE

[76] Inventor: Maurice Tardy, 19 Rue Jean-Jaures, Lorette; Loire, France

[21] Appl. No.: 704,193

[22] Filed: Feb. 22, 1985

[30] Foreign Application Priority Data

Feb. 23, 1984 [FR] France ............................ 84 03330

[51] Int. Cl.⁴ ............................................. F15B 13/04
[52] U.S. Cl. ........................... 137/625.68; 137/596.1; 137/625.69; 251/900
[58] Field of Search ............................... 91/451, 465; 137/625.68, 625.69, 596.1; 251/DIG. 1, 900

[56] References Cited

U.S. PATENT DOCUMENTS 2,979,080  4/1961  Hewitt ..................... 137/625.69 X
3,107,694  10/1963  Hastings et al. ............. 137/596.1 X

*Primary Examiner*—Gerald A. Michalsky
*Attorney, Agent, or Firm*—Remy J. VanOphem

[57] ABSTRACT

A hydraulic control valve whose spool slides within a stator in which gaskets are provided to insure the watertightness of the sliding motion. Due to the placement of various bores, the ports may be crossed by the gaskets without damage because the gaskets are either under balanced pressure upon crossing the ports, or under the prevailing pressure of the port which is being crossed. A watertight hydraulic slide control valve having a stator with distribution ports is positioned along the wall of a longitudinal bore. A grooved slide spool having a plurality of gaskets is positioned to slide inside the bore of the stator. When any one of the plurality of gaskets crosses a distribution port during a switching operation, the pressure acting on the gasket within the bore is less than or equal to the pressure applied to the gasket from the distribution port when the gasket passes across the distribution port.

6 Claims, 4 Drawing Figures

SLIDE CONTROL VALVE

BACKGROUND OF THE INVENTION

The present invention pertains to a switching process and to a new type of slide control valve designed for the control of a hydraulic circuit of the same type as those used on machines, vehicles, public work equipment, or mining equipment.

This type of hydraulic circuit is usually operated by means of a control valve having a spool sliding longitudinally inside the bore of a stator. Grooves are provided on the surface of the spool which moves in front of ports opening into the bore. Each one of the ports is connected with one conduit of the circuit. Therefore, the consecutive areas of the spool's periphery cover or uncover the side openings of the bore.

Generally, this arrangement is quite satisfactory, but the apparatus is not entirely sealed and, therefore, cannot be used with aqueous fluids as leaks become too important. In order to obtain a satisfactory internal watertightness, the spool must be equipped with gaskets which slide when passing in front of the openings located on the periphery of the bore. Experience shows that if great care is not exercised during assembly operations, the gaskets deteriorate quickly as they are repeatedly passed in front of the bore openings. It has been found that the higher the pressures to which the gaskets are subjected, the more rapid their deterioration.

The present invention eliminates these disadvantages by offering a watertight slide control valve whose gaskets are able to repeatedly pass in front of the bore openings without deteriorating.

SUMMARY OF THE PRESENT INVENTION

A watertight slide control valve according to the present invention includes a grooved sliding spool equipped with several gaskets sliding longitudinally inside the bore of a stator. The bore itself includes distribution ports drilled along its side wall. This slide control valve is characterized by the fact that, at any given moment of the switching operation, as a gasket passes in front of a port of the bore, the pressure which pushes the gasket outward, against the internal wall of the bore where the port opens, is less than or equal to the counterpressure prevailing in the port.

According to another feature of the present invention, the gasket is under balanced pressure as it passes in front of a port. This is due to the fact that the pressure applied from the sliding spool, which pushes the gasket outward against the internal wall of the bore, is equal to the counterpressure prevailing in the port.

According to yet another feature of the present invention, the pressure which pushes the gasket toward the outside of the sliding spool, against the internal wall of the bore, is lower than the counterpressure prevailing in the port.

According to still yet another feature of the present invention, the gasket sliding in front of a port causes a communication in the pressure valve, by switching from one of the above specifications to the other while keeping the pressure in the port of the stator at a level higher than or equal to the counterpressure which pushes the spool gasket away and against the internal wall of the bore.

The attached drawings will allow a better understanding of the present invention when viewed in conjunction with the following detailed description and claims appended thereto.

DETAILED DESCRIPTION OF THE PREFERRED EMBODIMENT

Figure 1:
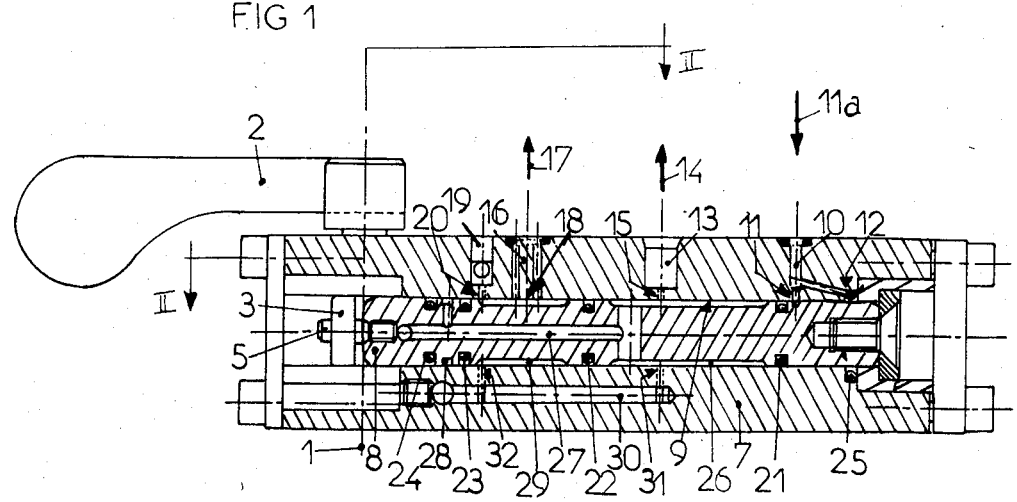
FIG. 1 is a longitudinal partial cross-sectional view of a watertight control valve according to the present invention, illustrated in a neutral position.
Figure 2:
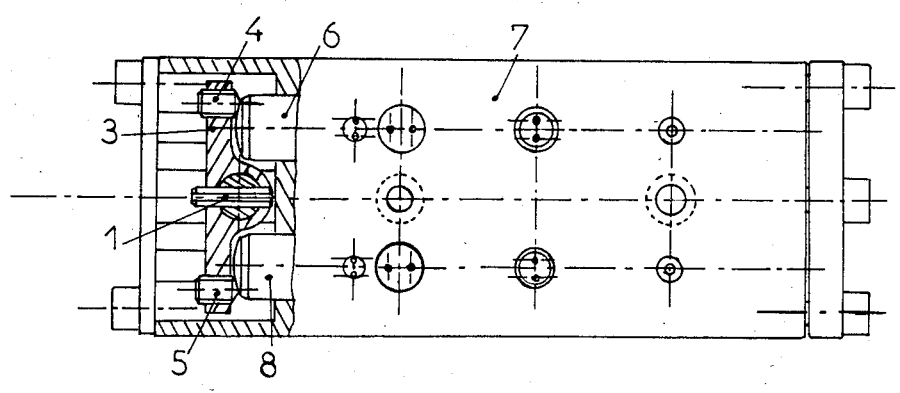
FIG. 2 is an offset sectional view taken along lines II—II of FIG. 1.

The drawings illustrate a hydraulic switch, controlled in a usual manner by tilting of a lever 2 around its axis 1. The lever is rigidly mounted with a rocker 3 whose ends are respectively equipped with an adjustable push-rod 4 or 5. The push-rod 4 actuates the end of a valve or slide spool 6 to make it slide inside a stator 7 toward a spring, not illustrated. The push-rod 5 interfaces with the end of a valve or slide spool 8, which also slides inside the stator 7 toward a spring, not illustrated.

Figure 3:
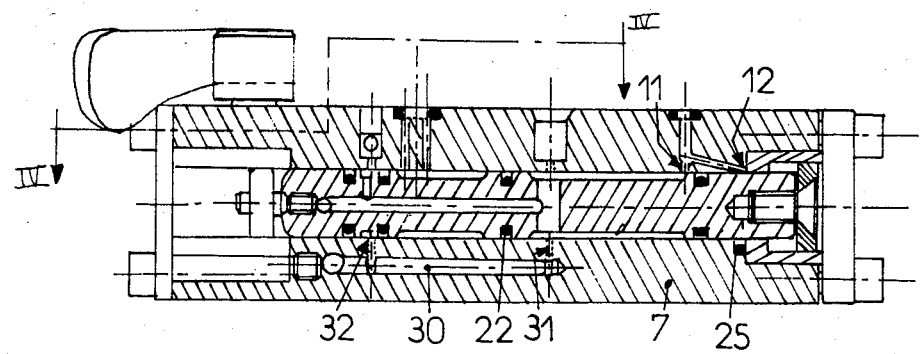
FIG. 3 is a view similar to that of FIG. 1, illustrating the spool of the present invention in a switching position.
Figure 4:
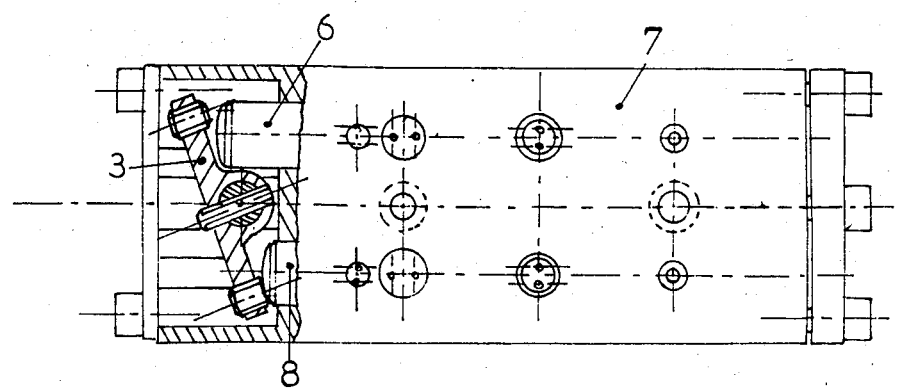
FIG. 4 is an offset sectional view taken along lines IV—IV of FIG. 3.

As an example, a partial sectional view of the slide spool 8 is illustrated in FIGS. 1 and 3, and the same configuration applies, of course, to the slide spool 6.

The slide spool 8 slides in a bore 9 of the stator 7, the distribution being provided by ports drilled in the wall of the bore 9.

An inlet conduit 10, through which the inlet pressure is channeled as indicated by arrow 11a, is forked at one end, defining two outlet ports 11 and 12 in the wall of the bore 9.

A drilled opening 13, connected with the operating equipment, as indicated by arrow 14, intersects with the bore 9 through a port 15. Another drilled opening 16, which provides the return to the tank, as indicated by arrow 17, opens in the bore 9 through a port 18. Finally, a pressure relief valve 19 communicates with the bore 9 through a port 20.

To insure watertightness, the slide spool 8 is provided with several transverse grooves, each of which houses a compound type gasket. In the example illustrated herein, there are four gaskets 21, 22, 23 and 24.

Furthermore, the end of the slide spool 8, opposite to the location of the rocker 3, slides impermeably inside a gasket 25 provided in the stator 7. The gasket 25, of course, could also be mounted in the same way as the gaskets 21 through 24.

Between the gaskets 21 and 22, the slide spool 8 forms a groove 26 which is connected at all times through internally drilled conduits, such as 27, with another groove 28 provided on the slide spool between the gaskets 23 and 24. The dimensions of the assembly are such that the groove 26 is continuously in communication with the port 15, regardless of the longitudinal position of the slide spool 8. The gasket 23, however, alternatively moves from one side of the port 20 to the other.

Another groove 29 is provided between the gaskets 22 and 23, and is continuously in communication with the port 18, regardless of the axial position of the slide spool 8.

Finally, the stator 7 includes a longitudinal, lateral conduit 30 which is connected with the bore 9 through two ports 31 and 32. The location of the port 31 is such that it is continuously in communication with the groove 26. The location of the port 32, however, is selected in relation with the travel of the movement of the gasket 23 which, thus, alternatively moves from one side of the port 32 to the other.

The device operates in the manner described hereafter.

As the operator actuates the lever 2 in order to slide the slide spool 8 from the position illustrated in FIG. 1 to that illustrated in FIG. 3, the gasket 21 will pass by the port 11, while simultaneously the gasket 23 will pass by the ports 20 and 32.

During this motion, the slide spool 8 performs the following consecutive operations while sliding from the position illustrated in FIG. 1 to that illustrated in FIG. 3.

The connection between the drilled opening 13, and the drilled opening 16, through groove 26, port 31, lateral conduit 30, port 32, groove 29, and port 20 is broken by interrupting the communication between the conduit 30 and the drilled opening 13, and then connecting the conduit 30 with the groove 28 through port 32. An equal pressure, thus, exists on either side of the gasket 23 which is, therefore, placed under balanced pressure.

Moving of the slide spool 8 also establishes a connection between the conduit 10, and the drilled opening 13, so that, as the gasket 21 passes by the port 11, the pressure applied from the latter prevails.

Therefore, in the course of this motion, the pressure prevailing between the gaskets 25 and 21 as a result of the pressures at ports 11 and 12 is applied on either side of the gasket 21 which is now under balanced pressure. As the gasket 21 passes by the port 11, the pressure existing in that port is the same as that prevailing between the gaskets 25 and 21. This equality is permanently maintained by the outlet port 12.

If the operator releases the control lever 2, the slide spool 8 is brought back by its return spring mechanism from the position illustrated in FIG. 3 to that illustrated in FIG. 1. The gaskets 21 and 23 must slide again across the ports of the stator 7. During this operation, the gasket 21 was under balanced pressure between both ports 11 and 12, and the gasket 23 was under balanced pressure before being subjected to a prevailing pressure applied from the port 32.

It will be apparent from the above description that in either direction, the invention complies with the two rules hereunder. As a gasket slides in front of a port, it is either under balanced pressure, i.e., the pressure prevailing in the bore 9 is equal to the pressure in the port, or the gasket is not under balanced pressure, but the higher of both pressures is the one applied from the port.

Both rules may be summarized as follows: the pressure applied to the gasket from the port is higher or equal to the counterpressure applied to the gasket from within the bore 9.

The return mechanism provided for each slide spool 6 and 8 may be a spring, or it may even consist of the application of pressure on a carefully selected area, so as to keep the return effort at an acceptable value and, thus, compensate the friction of the gaskets in the bore 9.

In the example illustrated herein, the return operation is performed hydraulically by applying pressure on an area located between the gaskets 21 and 25 whose diameter is slightly smaller than that of the bore 9. The hydraulic return effort is, thus, proportional to the pressure. Furthermore, the friction of the gaskets 21 through 25 is also proportional to the pressure. It is, thus, possible to ideally match the return effort with the opposing effort.

What is claimed is:

1. A hydraulic fluid valve utilizing a source of hydraulic fluid in a hydraulic system, said hydraulic valve comprising:

a housing having a bore extending longitudinally through said housing; an inlet conduit communicating with said bore, said inlet conduit having a pressurized fluid therein at a first predetermined pressure; a first drilled opening communicating with said bore, said first drilled opening having a pressurized fluid therein at a second predetermined pressure, said first predetermined pressure being equal to or greater than said second predetermined pressure; a second drilled opening communicating with said bore; and a lateral conduit having a first port and a second port communicating with said bore;

a slide pool slidably mounted in said bore of said housing, said slide pool comprising a first grooved portion defining a first passage, said first passage communicating with said first drilled opening; a second grooved portion defining a second passage, said second grooved portion spaced a predetermined distance from said first grooved portion, said second passage communicating pressurized fluid to said second drilled opening; and means for moving said slide spool along said bore between a neutral position and a first predetermined position whereby said second port communicates pressurized fluid to said bore at a pressure substantially equal to the pressure present in said first passage of said slide spool;

a first gasket member mounted to said slide spool, said first gasket member being adjacent said first grooved portion of said slide spool, said first gasket member being positioned on said slide spool such that said first gasket member passes across said inlet conduit when said slide spool moves between said neutral position and said first predetermined position;

a second gasket member positioned on said slide spool, said second gasket member being adjacent said second grooved portion of said slide spool, said second gasket member being positioned on said slide spool such that said second gasket member passes across said second port of said lateral conduit when said slide spool moves between said neutral position and said first predetermined position;

an outlet port positioned in said housing, said outlet port with said inlet conduit for communicating pressurized fluid to said bore of said housing at said first predetermined pressure such that a pressure substantially equal to said first predetermined pressure is maintained on said first gasket member as it crosses said inlet conduit whereby deterioration of said first gasket member is prevented;

a drilled conduit portion positioned in said slide spool, said drilled conduit portion communicating with said first passage of said slide spool for fluid flow therethrough; and a third grooved portion on said slide spool defining a third passage communicating with said bore of said housing and said drilled conduit portion of said slide spool for delivery of pressurized fluid at said second predetermined pressure to said bore adjacent to said second gasket member.

2. The hydraulic fluid valve as claimed in claim 1, wherein said means for moving said slide spool further comprises:
 a rocker member pivotally mounted to said housing;
 a lever member mounted to said rocker member for pivoting said rocker member;
 a push-rod member mounted to said rocker member, said push-rod member positioned in abutment with said slide spool such that movement of said lever member in a predetermined direction directs said push-rod member to move said slide spool from said neutral position to said first predetermined position; and
 means for biasing said slide spool into said neutral position, said means for biasing disposed in said housing.

3. The hydraulic fluid valve as claimed in claim 1, further comprising:
 a pressure relief valve positioned in said housing, said pressure relief valve communicating with said second passage of said slide spool when said slide spool is in said neutral position, said pressure relief valve further communicating with said third grooved portion of said slide spool when said slide spool is in said first predetermined position.

4. The hydraulic fluid valve as claimed in claim 1, wherein said bore of said housing further comprises:
 a pair of bores positioned in a spaced apart relationship in said housing.

5. The hydraulic fluid valve as claimed in claim 4, wherein said slide spool further comprises:
 a pair of slide spools, each of said pair of slide spools movably disposed in a respective one of said pair of bores.

6. The hydraulic fluid valve as claimed in claim 5, wherein said means for moving said slide spool comprises:
 a rocker member pivotally mounted to said housing, said rocker member having a pair of arms, each of said pair of arms extending into a respective one of said pair of bores;
 a lever member mounted to said rocker member for pivoting said rocker member;
 a pair of push-rod members, each of said pair of push-rod members mounted to a respective one of said pair of arms, each of said pair of push-rod members positioned in abutment with a respective one of said pair of slide spools, such that moving said lever member to a first predetermined location from a rest position moves said rocker member and one of said pair of push-rod members to direct one of said pair of slide spools into said first predetermined position and further such that moving said lever member to a second predetermined location moves the other of said pair of slide spools into said first predetermined position.

* * * * *

UNITED STATES PATENT AND TRADEMARK OFFICE
CERTIFICATE OF CORRECTION

PATENT NO. : 4,596,274
DATED : June 24, 1986
INVENTOR(S) : Maurice Tardy

It is certified that error appears in the above-identified patent and that said Letters Patent is hereby corrected as shown below:

Column 4, line 24, delete " pool " and insert ---- spool ----.

Column 4, line 25, delete " pool " and insert ---- spool ----.

Column 4, line 58, after " port " insert ---- communicating ----.

Signed and Sealed this

Eleventh Day of November, 1986

*Attest:*

DONALD J. QUIGG

*Attesting Officer*        *Commissioner of Patents and Trademarks*